United States Patent
Tang

(10) Patent No.: US 10,856,283 B2
(45) Date of Patent: Dec. 1, 2020

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/098,378

(22) PCT Filed: Jul. 12, 2016

(86) PCT No.: PCT/CN2016/089832
§ 371 (c)(1),
(2) Date: Nov. 1, 2018

(87) PCT Pub. No.: WO2018/010102
PCT Pub. Date: Jan. 18, 2018

(65) Prior Publication Data
US 2019/0159178 A1    May 23, 2019

(51) Int. Cl.
*H04W 4/00* (2018.01)
*H04W 72/04* (2009.01)
*H04L 5/00* (2006.01)
*H04L 1/00* (2006.01)
*H04L 27/26* (2006.01)
(Continued)

(52) U.S. Cl.
CPC ......... *H04W 72/042* (2013.01); *H04L 1/0038* (2013.01); *H04L 1/0075* (2013.01);
(Continued)

(58) Field of Classification Search
None
See application file for complete search history.

(56) References Cited

U.S. PATENT DOCUMENTS 9,148,878 B2    9/2015 Guan et al.
2014/0119269 A1    5/2014 Guan et al.
(Continued)

FOREIGN PATENT DOCUMENTS

CN    102868480 A    1/2013
CN    103139844 A    6/2013
(Continued)

OTHER PUBLICATIONS

Supplementary European Search Report in European application No. EP 16908431.6, dated Mar. 1, 2019.
(Continued)

*Primary Examiner* — Zewdu A Beyen
(74) *Attorney, Agent, or Firm* — Ladas & Parry LLP

(57) ABSTRACT

Disclosed are a data transmission method, a terminal device and a network device. The method comprises: the terminal device determining a basic parameter set for transmitting data; the terminal device detecting, according to the basic parameter set, downlink control information DCI sent by the network device for scheduling data; the terminal device detecting, according to the basic parameter set and the detected DCI, data sent by the network device, or sending data to the network device. The data transmission method, the terminal device and the network device of the embodiments of the present invention can realize the scheduling using different DCI formats for the data transmission on the basis of different basic parameter sets, and increase the flexibility of the control signaling design.

20 Claims, 11 Drawing Sheets

(51) Int. Cl.
    *H04W 72/12* (2009.01)
    *H04W 28/16* (2009.01)
(52) U.S. Cl.
    CPC .......... *H04L 5/0007* (2013.01); *H04L 5/0044* (2013.01); *H04L 5/0053* (2013.01); *H04L 27/2602* (2013.01); *H04L 27/2613* (2013.01); *H04W 72/12* (2013.01); *H04L 5/0051* (2013.01); *H04L 27/2666* (2013.01); *H04W 28/16* (2013.01)

(56) References Cited

U.S. PATENT DOCUMENTS

| | | | | |
|---|---|---|---|---|
| 2015/0358111 | A1* | 12/2015 | Marinier | H04L 1/0026 370/329 |
| 2016/0066343 | A1 | 3/2016 | Lin et al. | |
| 2017/0201968 | A1* | 7/2017 | Nam | H04W 4/70 |
| 2017/0290008 | A1 | 10/2017 | Tooher et al. | |
| 2017/0332359 | A1 | 11/2017 | Tsai et al. | |

FOREIGN PATENT DOCUMENTS

| | | | | |
|---|---|---|---|---|
| CN | 103974430 | A | 8/2014 | |
| CN | 104113924 | A | 10/2014 | |
| CN | 104144513 | A | 11/2014 | |
| CN | 105578608 | A | 5/2016 | |
| JP | 2013509752 | A | 3/2013 | |
| JP | 2017533620 | A | 11/2017 | |
| WO | 2015180175 | A1 | 12/2015 | |
| WO | 2016040290 | A1 | 3/2016 | |
| WO | WO-2016040290 | A1 * | 3/2016 | H04L 1/0007 |
| WO | 2017197125 | A1 | 11/2017 | |

OTHER PUBLICATIONS

English Translation of the Written Opinion of the International Search Authority in intentional application No. PCT/CN2016/089832, dated Apr. 1, 2017.

Samsung: "Remaining Details on DCI Contents", 3GPP Draft: RI-163276 DCI, 3rd Generation Partnership Project (3GPP), Mobile Competence Centre ; 650, Route Des Lucioles ; F-06921 Sophia-Antipolis Cedex; France, vol. RAN WG1, No. Busan, Korea; Apr. 11, 2016-Apr. 15, 2016 Apr. 6, 2016 (Apr. 6, 2016), XP051080763, Retrieved from the Internet: URL:http://www.3gpp.org/ftp/tsg_ran/WG1_RL1/TSGR1_84b/Docs/ [retrieved on Apr. 6, 2016] * the whole document *.

International Search Report in international application No. PCT/CN2016/089832, dated Apr. 1, 2017.

Written Opinion of the International Search Authority in international application No. PCT/CN2016/089832, dated Apr. 1, 2017.

Erik Dahlman et al., 4G LTE/LTE-Advanced, Marzen Publishing Co., Ltd., Oct. 20, 2015, pp. 220 to 227, 239, pp. to 246.

Oppo and Discussion on TTI shortening [online], 3GPP TSG-RAN WG1#84b R1-162339 Apr. 15, 2016, available at http://www.3gpp.org/ftp/tsg_ran/WG1_RL1/TSGR1_84b/Docs/R1-162339.zip.

Nokia, Alcatel-Lucent Shanghai Bell, Ericsson, Oppo, WF on sTTI operation [online], 3GPP TSG-RAN WG1#84b R1-163724, Apr. 15, 2016, available at http://www.3gpp.org/ftp/tsg_ran/WG1_RL1/TSGR1_84b/Docs/R1-163724.zip.

Session Chairman (Nokia), Chairman's Notes of Agenda Item 7.3.10 on Study on Latency Reduction Techniques [online], 3GPP TSG-RAN WG1# 84b R1-163843 Apr. 15, 2016, available at http://www.3gpp.org/ftp/tsg_ran/WG1_RL1/TSGR1_84b/Docs/R1-163843.zip.

First Office Action in corresponding Chinese application No. 201680085496.4, dated Mar. 5, 2020.

First Office Action in corresponding Japanese application No. 2018-562012, dated Mar. 6, 2020.

First Office Action in corresponding European application No. 16908431.6, dated Apr. 16, 2020.

First Office Action of the Indian application No. 201917002439, dated Jul. 24, 2020.

Second Office Action of the Chinese application No. 201680084596.4, dated Jun. 1, 20202.

Second Office Action of the European application No. 16908431.6, dated Sep. 1, 2020.

* cited by examiner

DATA TRANSMISSION METHOD, TERMINAL DEVICE, AND NETWORK DEVICE

RELATED APPLICATION

This application is an application under 35 U.S.C. 371 of International Application No. PCT/CN2016/089832 filed on Jul. 12, 2016, the entire contents of which are incorporated herein by reference.

TECHNICAL FIELD

The disclosure relates to the field of communication, and more particularly to a data transmission method, a terminal device and a network device.

BACKGROUND

In a 5th-Generation (5G) mobile communication technology, User Equipment (UE) may support various different numerologies (numerology) in a carrier. These different numerologies may be multiplexed in a Time Division Multiplex (TDM) or Frequency Division Multiplex (FDM) manner. For example, different frequency-domain resources in the same Transmission Time Interval (TTI) may be allocated to data transmission of different numerologies or different TTIs may be configured for data transmission of different numerologies. Therefore, how to schedule data transmission based on different numerologies is a problem urgent to be solved.

SUMMARY

Embodiments of the disclosure provide a data transmission method, a terminal device and a network device, which solve the problem of how to schedule data transmission based on different numerologies.

A first aspect provides a data transmission method, which may include that: a terminal device determines a numerology used in transmitting data; the terminal device detects Downlink Control Information (DCI) sent by a network device and configured to schedule the data according to the basic parameter set; and the terminal device detects the data sent by the network device or sends the data to the network device according to the numerology and the detected DCI.

In such a manner, according to the method of the embodiments of the disclosure, data transmission based on different numerologies is scheduled by use of different DCI formats, so that control signaling design flexibility is improved.

Optionally, data transmission with different basic parameter sets may be scheduled through an independent control channel and different DCI formats, so that the control signaling design flexibility is further improved.

In addition, the terminal device may learn a DCI format used for blind detection of the DCI according to the basic parameter set, so that control channel detection complexity of the terminal device is reduced.

As another embodiment, the operation that the terminal device determines the numerology used in transmitting the data may include the following operation.

The terminal device determines the numerology used in transmitting the data from multiple predefined numerologies.

As another embodiment, the numerology may include at least one resource parameter configured to determine a time-frequency resource transmitting the data.

As another embodiment, before the operation that the terminal device determines the numerology used in transmitting the data, the method may further include the following operation.

The terminal device receives configuration information sent by the network device, the configuration information including information about the numerology used in transmitting the data.

The operation that the terminal device determines the numerology used in transmitting the data may include the following operation.

The terminal device determines the numerology used in transmitting the data according to the configuration information.

As another embodiment, the operation that the terminal device determines the numerology used in transmitting the data may include the following operations.

The terminal device detects a target signal or target channel corresponding to the terminal device according to the multiple predefined numerologies.

The terminal device determines a numerology corresponding to the target signal or the target channel as the numerology used in transmitting the data.

As another embodiment, the operation that the terminal device detects the DCI sent by the network device and configured to schedule the data according to the numerology may include the following operation.

The terminal device detects the DCI sent by the network device and configured to schedule the data according to at least one parameter in the basic parameter set.

As another embodiment, the operation that the terminal device detects the DCI sent by the network device and configured to schedule the data according to the numerology may include the following operations.

The terminal device determines a DCI format configured to detect the DCI according to the numerology and correspondences between numerologies and DCI formats.

The terminal device detects the DCI sent by the network device and configured to schedule the data according to the DCI format.

As another embodiment, before the operation that the terminal device determines the DCI format configured to detect the DCI according to the numerology and the correspondences between numerologies and DCI formats, the method may further include the following operation.

The terminal device receives indication information sent by the network device, the indication information indicating the correspondences between numerologies and DCI formats.

It is to be understood that the correspondences between numerologies and DCI formats may be determined by the network device and may also be predetermined between the network device and the terminal device.

As another embodiment, different DCI formats may correspond to different control information lengths, and/or DCI format indication bits in different DCI formats may indicate different information.

As another embodiment, if different DCI formats correspond to different numerologies and the different DCI formats include the same control information field, the same control information field may occupy different numbers of bits in different DCI and/or the same control information field may indicate different contents in the different DCI formats.

A length of the DCI refers to the total bit number of control information in the DCI and a content of the DCI refers to a control information field in the DCI and a content indicated by each control information field.

That is, different numerologies correspond to different DCI formats and different DCI formats may be distinguished through at least one of lengths of DCI, contents of control information in the DCI, lengths of control information fields and contents indicated by the control information fields. Namely, lengths of DCI corresponding to different DCI formats are different, and/or contents of control information in the DCI corresponding to different DCI formats are different, and/or, for the same control information field, the same control information field in the DCI corresponding to different DCI formats occupies different numbers of bits, and/or, for the same control information field, the same control information field in the DCI corresponding to different DCI formats indicates different contents.

As another embodiment, the control information field may include at least one of:

a control information field for indicating physical resource allocation, a control information field for indicating an Acknowledgment (ACK)/Negative Acknowledgment (HACK) feedback time sequence, a control information field for indicating a frequency hopping configuration, a control information field for indicating a Modulation Coding Scheme (MCS), a control information field for indicating a subframe structure or a control information field for indicating a Demodulation Reference Signal (DMRS) configuration.

The control information field configured to indicate physical resource allocation may be, for example, a Resource Block (RB) allocation information field configured to indicate a Physical Resource Block (PRB) occupied by data transmission scheduled by the DCI; the control information field configured to indicate the ACK/NACK feedback time sequence indicates a time sequence relationship between data transmission and corresponding ACK/NACK feedback, for example, a subframe number offset between a subframe where data transmission is located and a subframe where corresponding ACK/NACK feedback is located; the control information field configured to indicate the frequency hopping configuration is, for example, a control information field for indicating frequency-domain frequency hopping; the control information field configured to indicate the DMRS is, for example, a control information field for indicating information of a port, scrambling sequence and the like for a DMRS; and the control information field configured to indicate the subframe structure is, for example, a total Orthogonal Frequency Division Multiplexing (OFDM) symbol number of a subframe, or a Guard Period (GP) number or location of the subframe or a number configuration of OFDM symbols of different types in the subframe, for example, a number or proportion configuration of downlink control symbols, downlink data symbols and uplink control symbols in the subframe or a number or proportion configuration of the downlink control symbols and uplink data symbols in the subframe.

As another embodiment, the numerology may include at least one of the following parameters:

a subcarrier spacing, a total number of subcarriers under a specific bandwidth, a total number of subcarriers of a PRB, an OFDM symbol length, the point number of Fourier transform or inverse Fourier transform for generating an OFDM signal, a total number of OFDM symbols of a TTI, a total number of TTIs in a specific time length or a signal prefix length.

The subcarrier spacing refers to a frequency interval of adjacent subcarriers, for example, 15 kHz and 60 khz; the subcarrier number under the specific bandwidth is, for example, a total number of subcarriers corresponding to each possible system bandwidth; the subcarrier number of the PRB may typically be, for example, an integral multiple of 12; the OFDM symbol number of the TTI may typically be, for example, an integral multiple of 14; the number of the TTIs in a certain time unit may refer to a total number of TTIs in a time length 1 ms or 10 ms; and the signal prefix length is, for example, a time length of a Cyclic Prefix (CP) of a signal or whether the CP uses a normal CP or an extended CP.

A second aspect provides a terminal device, which may be configured to execute each process executed by the terminal device in the data transmission method in the first aspect and each implementation mode. The terminal device includes: a determination module, configured to determine a numerology used in transmitting data; a detection module, configured to detect DCI sent by a network device and configured to schedule the data according to the numerology determined by the determination module; and a transmission module, configured to detect the data sent by the network device or send the data to the network device according to the numerology determined by the determination module and the DCI detected by the detection module.

A third aspect provides a terminal device, which may be configured to execute each process executed by the terminal device in the data transmission method in the first aspect and each implementation mode. The terminal device includes: a processor, configured to determine a numerology used in transmitting data and detect DCI sent by a network device and configured to schedule the data according to the numerology determined by a determination module; and a transceiver, configured to detect the data sent by the network device or send the data to the network device according to the numerology determined by the determination module and the DCI detected by a detection module.

A fourth aspect provides a data transmission method, which may include that: a network device determines a numerology used in transmitting data; the network device sends DCI configured to schedule the data to a terminal network according to the numerology; and the network device sends the data to the terminal device or receives the data to the terminal device according to the numerology and the DCI.

In such a manner, data transmission based on different numerologies is scheduled by use of different DCI formats, so that control signaling design flexibility is improved.

Optionally, data transmission with different numerologies may be scheduled through an independent control channel and different DCI formats, so that the control signaling design flexibility is further improved.

As another embodiment, the operation that the network device determines the numerology used in transmitting the data may include the following operation.

The network device determines the numerology used in transmitting the data from multiple predefined numerologies.

As another embodiment, the operation that the network device sends the DCI configured to schedule the data to the terminal device according to the numerology may include the following operations.

The network device determines a DCI format of the DCI according to the numerology and correspondences between numerologies and DCI formats.

The network device sends the DCI configured to schedule the data to the terminal device according to the DCI format.

As another embodiment, the method may further include the following operations.

The network device determines the correspondences between numerologies and DCI formats.

The network device sends indication information to the terminal device, the indication information indicating the correspondences.

As another embodiment, the operation that the network device sends the DCI configured to schedule the data to the terminal device according to the numerology may include the following operation.

The network device sends the DCI configured to schedule the data to the terminal device according to at least one parameter in the basic parameter set.

As another embodiment, after the operation that the network device determines the numerology used in transmitting the data, the method may further include the following operation.

The network device sends configuration information to the terminal device, the configuration information including information about the numerology used in transmitting the data.

As another embodiment, different DCI formats may correspond to different control information lengths, and/or DCI format indication bits in different DCI formats may indicate different information.

As another embodiment, if different DCI formats correspond to different numerologies and the different DCI formats include the same control information field, the same control information field may occupy different numbers of bits in different DCI and/or the same control information field may indicate different contents in the different DCI formats.

As another embodiment, the control information field may include at least one of:

a control information field for indicating physical resource allocation, a control information field for indicating an ACK/NACK feedback time sequence, a control information field for indicating a frequency hopping configuration, a control information field for indicating an MCS, a control information field for indicating a subframe structure or a control information field for indicating a DMRS configuration.

As another embodiment, the numerology may include at least one of the following parameters:

a subcarrier spacing, a total number of subcarriers under a specific bandwidth, a total number of subcarriers of a PRB, a length of an OFDM symbol, the point number of Fourier transform or inverse Fourier transform for generating an OFDM signal, a total number of OFDM symbols of a TTI, a total number of TTIs in a specific time length or a signal prefix length.

A fifth aspect provides a network device, which may be configured to execute each process executed by the network device in the data transmission method in the fourth aspect and each implementation mode and includes: a determination module, configured to determine a numerology used in transmitting data; and a transmission module, configured to send DCI configured to schedule the data to a terminal device according to the numerology determined by the determination module and send the data to the terminal device or receive the data sent by the terminal device according to the numerology and the DCI.

A sixth aspect provides a network device, which may be configured to execute each process executed by the network device in the data transmission method in the fourth aspect and each implementation mode and includes: a processor, configured to determine a numerology used in transmitting data; and a transceiver, configured to send DCI configured to schedule the data to a terminal device according to the numerology determined by a determination module and send the data to the terminal device or receive the data sent by the terminal device according to the numerology and the DCI.

A seventh aspect provides a computer chip, which includes an input interface, an output interface, at least one processor and a memory, wherein the processor is configured to execute a code in the memory, and when the code is executed, the processor may implement each process executed by a terminal device in a data transmission method in the first aspect and each implementation mode.

An eighth aspect provides a computer chip, which includes an input interface, an output interface, at least one processor and a memory, wherein the processor is configured to execute a code in the memory, and when the code is executed, the processor may implement each process executed by a network device in a data transmission method in the fourth aspect and each implementation mode.

A ninth aspect provides a computer-readable storage medium, which stores a program, wherein the program enables a terminal device to execute any data transmission method in the first aspect and each implementation mode thereof.

A tenth aspect provides a computer-readable storage medium, which stores a program, wherein the program enables a network device to execute any data transmission method in the fourth aspect and each implementation mode thereof.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be understood that the technical solutions of the embodiments of the disclosure may be applied to various communication systems, for example, a present communication system of a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, a Universal Mobile Telecommunication System (UMTS) and the like, and are particularly applied to a future 5G system.

In the embodiments of the disclosure, a terminal device may also refer to UE, an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in a future 5G network, a terminal device in a future evolved Public Land Mobile Network (PLMN) or the like.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle-mounted device, a wearable device, a network device in the future 5G network, a network device in the future evolved PLMN or the like.

Figure 1:
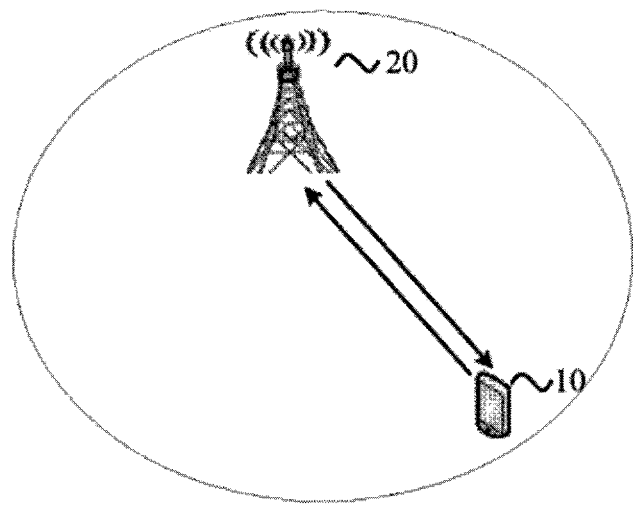
FIG. 1 is a schematic diagram of an application scenario according to an embodiment of the disclosure.

FIG. 1 is a schematic diagram of an application scenario according to the disclosure. A communication system in FIG. 1 may include a terminal device 10 and a network device 20. The network device 20 is configured to provide communication service for the terminal device 10 for access to a core network. The terminal device 10 searches a synchronization signal, broadcast signal and the like sent by the network device 20 to access the network, thereby communicating with the network. Arrows illustrated in FIG. 1 may represent uplink/downlink transmission implemented through a cellular link between the terminal device 10 and the network device 20. According to the embodiment of the disclosure, data transmission based on different numerologies is scheduled by use of different DCI formats, so that control signaling design flexibility may be improved.

Figure 2:
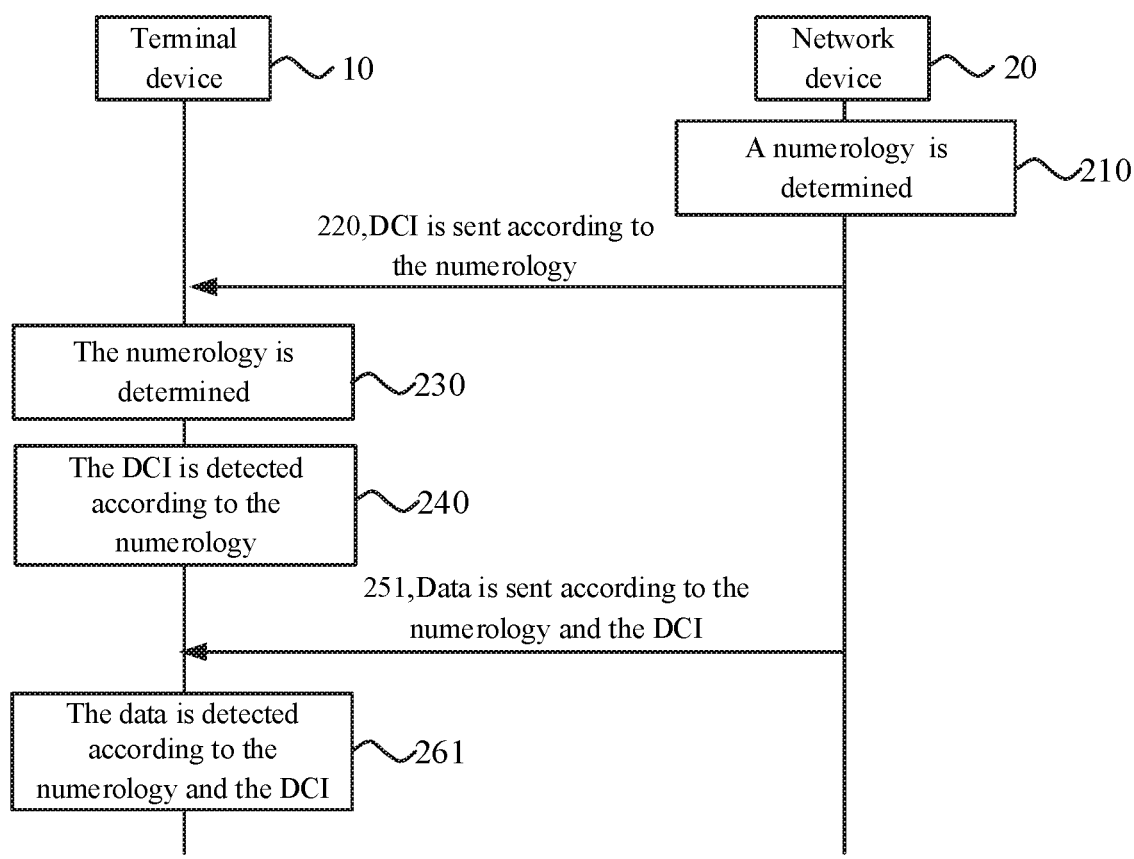
FIG. 2 is an interaction flowchart of a data transmission method according to an embodiment of the disclosure.

FIG. 2 is a schematic flowchart of a data transmission method according to an embodiment of the disclosure. A terminal device 10 and a network device 20 are illustrated in FIG. 2. As illustrated in FIG. 2, a specific flow for data transmission includes the following operations.

In 210, the network device 20 determines a numerology used in transmitting data.

For example, the network device 20 may determine the numerology used in transmitting the data from multiple predefined numerologies. Therefore, the DCI sent to the terminal device 10 may be determined according to the basic parameter set.

The numerology includes at least one resource parameter configured to determine a time-frequency resource transmitting the data.

Optionally, the numerology may include at least one of the following parameters:

a subcarrier spacing, a total number of subcarriers under a specific bandwidth, a total number of subcarriers of a PRB, an OFDM symbol length, the point number of Fourier transform, for example, Fast Fourier Transform (FFT), or inverse Fourier transform, for example, Inverse Fast Fourier Transform (IFFT), for generating an OFDM signal, a total number of OFDM symbols of a TTI, a total number of TTIs in a specific time length or a signal prefix length.

The subcarrier spacing refers to a frequency interval of adjacent subcarriers, for example, 15 kHz and 60 khz. The subcarrier number under the specific bandwidth is, for example, a total number of subcarriers corresponding to each possible system bandwidth. The subcarrier number of the PRB may typically be, for example, an integral multiple of 12. The OFDM symbol number of the TTI may typically be, for example, an integral multiple of 14. The number of the TTIs in a certain time unit may refer to a total number of TTIs in a time length 1 ms or 10 ms. The signal prefix length is, for example, a time length of a CP of a signal or whether the CP uses a normal CP or an extended CP.

In 220, the network device 20 sends DCI configured to schedule the data to the terminal device 10 according to the basic parameter set.

Specifically, in the embodiment of the disclosure, multiple different numerologies may be supported in the same carrier. These different numerologies may be multiplexed in a TDM or FDM manner. For example, different frequency-domain resources in the same TTI may be allocated to data transmission based on different numerologies or different TTIs may be configured for data transmission based on different numerologies. Data transmission based on different numerologies may be scheduled through an independent control channel or a common control channel. The network device, after determining the basic parameter set, may send the DCI configured to schedule the data to the terminal device 10 according to the basic parameter set. It is to be understood that the network device 20 may schedule data based on different numerologies through the independent control channel, may also schedule data based on different numerologies in the common control channel and may select a proper channel to schedule the data based on different numerologies according to different requirements. There are no limits made.

Optionally, the network device 20 may send the DCI configured to schedule the data to the terminal device 10 according to at least one parameter in the basic parameter set. Or the network device 20 may determine a DCI format of the DCI according to the numerology and correspondences between numerologies and DCI formats and send the DCI configured to schedule the data to the terminal device 10 according to the DCI format.

Specifically, the network device 20 may determine a physical resource for the DCI configured to schedule the data on the basis of at least one parameter in the basic parameter set and then send the DCI configured to schedule the data to the terminal device 10 on the determined physical resource. For example, the network device 20 may determine a total number of subcarriers and PRB number occupied by the control channel bearing the DCI on the basis of the subcarrier spacing in the basic parameter set, thereby sending the DCI to the terminal device 10 in the control channel on the corresponding subcarrier and PRB.

The network device 20 may also determine the DCI format of the DCI configured to schedule the data according to the determined numerology and the correspondences between numerologies and DCI formats and send the DCI configured to schedule the data to the terminal device 10 according to the DCI format.

For example, if the numerology includes the subcarrier spacing, the correspondences between numerologies and DCI formats may be illustrated in Table 1. A subcarrier spacing used for data transmission on a first frequency band is 15 kHz and a corresponding DCI format is a DCI format 1. A subcarrier spacing used for data transmission on a second frequency band is 30 KHz and a corresponding DCI format is a DCI format 2. A subcarrier spacing used for data transmission on a third frequency band is 60 kHz and a corresponding DCI format is a DCI format 3. A subcarrier spacing used for data transmission on a fourth frequency band is 120 kHz and a corresponding DCI format is a DCI format 4.

TABLE 1

| Subcarrier spacing | DCI format |
| --- | --- |
| 15 kHz | DCI format 1 |
| 30 kHz | DCI format 2 |
| 60 kHz | DCI format 3 |
| 120 kHz | DCI format 4 |

For a fixed system bandwidth, different subcarrier spacings correspond to different subcarrier numbers and also correspond to different total downlink PRB numbers and different bit numbers required by frequency-domain resource allocation. The bit numbers of frequency-domain resource allocation fields in the DCI formats corresponding to different subcarrier spacings are different, and total bit numbers of different DCI formats are also different. For example, if the bit numbers of the frequency-domain resource allocation fields in each DCI format are M, M–k, M–2k and M–3k, the bit numbers of control information in the four DCI formats are N, N–k, N–2k and N–3k respectively.

The network device 20 may also determine the DCI format of the DCI configured to schedule the data according to the determined numerology and the correspondences between numerologies and DCI formats, thereby sending the DCI to the terminal device 10 according to the DCI format.

In such a manner, data transmission based on different numerologies may be scheduled by use of different DCI formats, so that control signaling design flexibility is improved.

Optionally, data transmission with different numerologies may be scheduled through the independent control channel and different DCI formats, so that the control signaling design flexibility is further improved.

It is to be understood that the correspondences between numerologies and DCI formats may be determined by the network device 20 and may also be predetermined between the network device 20 and the terminal device 10.

In 230, the terminal device 10 determines the numerology configured for data transmission.

For example, the terminal device 10 may determine the numerology configured for data transmission in the multiple predefined numerologies. Therefore, the DCI sent by the network device 20 and configured to schedule the data may be detected according to the basic parameter set.

Optionally, the operation that the terminal device 10 determines the numerology configured for data transmission may refer to that the terminal device 10 may receive configuration information sent by the network device 20, the configuration information including information about the numerology configured for data transmission. That is, 231 and 232 are executed. Or the terminal device 10 performs blind detection on the multiple predefined numerologies and determines the numerology configured for data transmission in the multiple numerologies.

Figure 3:
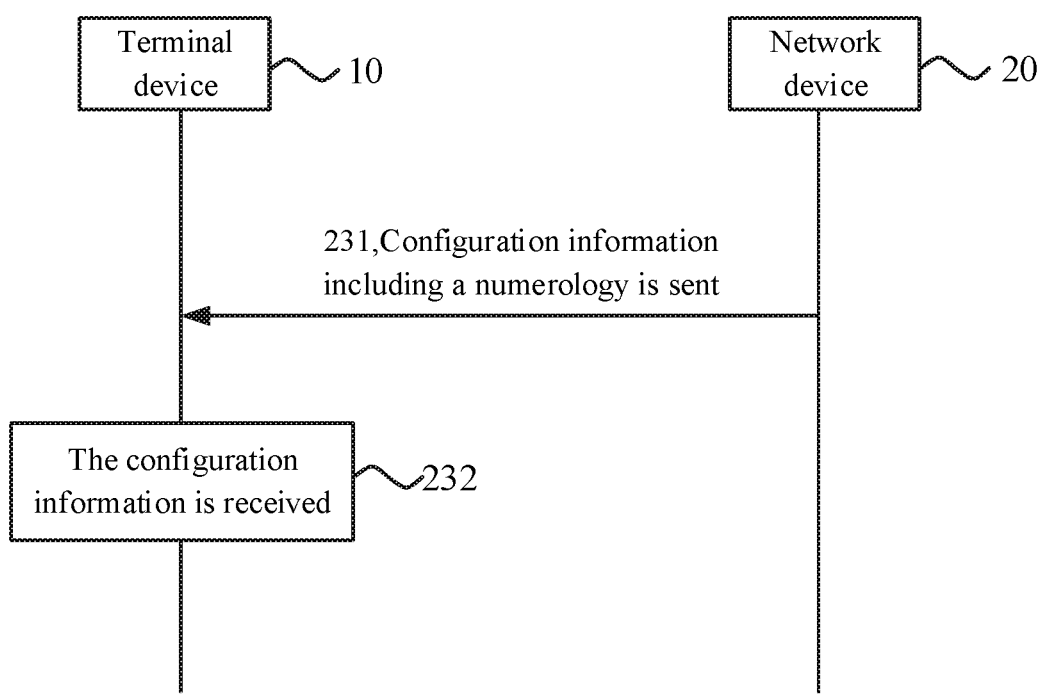
FIG. 3 is an interaction flowchart of a data transmission method according to another embodiment of the disclosure.

Optionally, the data transmission method 230 may further include 231 and 232. FIG. 3 is an interaction flowchart of a data transmission method according to another embodiment of the disclosure. The method includes 231 and 232. 230 may be replaced with 231 and 232.

In 231, the network device 20 sends the configuration information to the terminal device 10, the configuration information including the information about the numerology configured for data transmission.

Optionally, the network device 20 may send the configuration information to the terminal device 10 through high-layer signaling or physical-layer signaling.

Specifically, the network device 20, after determining the numerology configured for data transmission, may send the information about the numerology to the terminal device 10, and thus the terminal device may detect the DCI configured to schedule the data according to the basic parameter set. The network device 20 may configure a numerology for each frequency-domain resource set or time-domain resource set. For example, the network device 20 divides frequency-domain resources into multiple frequency-domain resource regions and configures the terminal device 10 to use different numerologies in each frequency-domain resource region. Or, the network device 20 divides time-domain resources into multiple time-domain resource regions and configures the terminal device 10 to use different a respective numerology in each time-domain resource region. A terminal, after receiving the configuration information, determines the numerology to be used by it according to the frequency-domain resource set or time-domain resource set where the physical resource is located. Here, the physical-layer signaling may be another piece of DCI except the DCI configured to schedule data transmission on the physical resource.

For example, according to Table 1, if the network device 20 determines that a numerology used for data transmission on the first frequency band is the numerology with the subcarrier spacing 15 kHz, the network device 20 may send the configuration information to the terminal device 10 to notify the terminal device 10 that the subcarrier spacing for data transmission is 15 kHz.

In 232, the terminal device 10 receives the configuration information including the information about the numerology from the network device 20.

Optionally, the terminal device 10 may receive the configuration information sent by the network device 20 through the high-layer signaling or the physical-layer signaling, thereby determining the numerology for data transmission. The terminal device 10, after receiving the configuration information including the information about the numerology from the network device 20, may detect the DCI configured to schedule the data according to the basic parameter set.

The operation that the terminal device 10 determines the numerology configured for data transmission may further refer to that the terminal device 10 performs blind detection on the multiple predefined numerologies and determines the numerology configured for data transmission in the multiple numerologies.

Specifically, the terminal device 10 performs detection on the basis of all possible numerologies or the predefined numerologies respectively until a certain target physical signal or target physical channel is successfully detected, thereby determining a corresponding numerology as the numerology for data transmission on the present physical resource. Here, the target physical signal may include a synchronization signal, a pilot signal and the like and the target physical channel may include a broadcast channel, a control channel and the like.

In 240, the terminal device 10 detects the DCI configured to schedule the data according to the basic parameter set.

The terminal device 10, after determining the basic parameter set, detects the DCI configured to schedule the data according to the basic parameter set. Optionally, the terminal device 10 may detect the DCI configured to schedule the data according to at least one parameter in the basic parameter set. Or the terminal device 10 may determine the DCI format of the DCI according to the numerology and the correspondences between numerologies and DCI formats and detect the DCI configured to schedule the data according to the DCI format.

If the terminal device 10 determines multiple DCI formats, the terminal device 10 is required to detect the DCI on the basis of each DCI format until the DCI configured to schedule the data is correctly detected on the basis of a certain DCI format.

In such a manner, the terminal device 10 may learn the DCI format used for blind detection of the DCI according to the basic parameter set, so that control channel detection complexity of the terminal device is reduced.

Specifically, the terminal device 10 may determine the physical resource configured to detect the DCI scheduling data transmission on the physical resource on the basis of at least one parameter in the numerology and then detect the DCI sent by the network device 20 and configured to schedule data transmission on the physical resource on the determined physical resource. For example, the terminal device 10 may determine a total number of subcarriers and PRB number occupied by the control channel bearing the DCI on the basis of the subcarrier spacing in the basic parameter set, thereby detecting the DCI in the control channel on the corresponding subcarrier and PRB.

The terminal device 10 may also determine the DCI format configured to detect the DCI according to the numerology and the correspondences between numerologies and DCI formats. The terminal device 10 detects the DCI configured to schedule the data according to the DCI format.

For example, if the terminal device 10 determines, according to Table 1, that the DCI format of the DCI for data transmission on the first frequency band is the DCI format 1, the terminal device 10 may detect the DCI sent by the network device 20 and configured to schedule data transmission on the first frequency band on the basis of the DCI format 1. The terminal device 10 detects data transmission, scheduled by the DCI, on the first frequency band according to the subcarrier spacing of the first frequency band and control information contained in the detected DCI. For example, the terminal device 10 may determine the subcarrier number and PRB number on the first frequency band, a time-domain sampling point number corresponding to an OFDM symbol and an OFDM symbol number in a TTI according to the subcarrier spacing. Then, data transmission scheduled by the DCI is detected according to these parameters and the control information in the DCI. The terminal may further detect DCI and data transmission on the second frequency band to the fourth frequency band on the basis of the same method.

For another example, if the terminal device 10 receives that a numerology for data transmission data transmission on a subframe n is a second numerology from the network device 20, the terminal device 10 detects DCI sent by the network device 20 and configured to schedule data transmission on the subframe n on a control channel of the subframe on the basis of the DCI format 3 and the DCI format 4 according to the correspondences, illustrated in Table 2, between the numerology and the DCI format. If the terminal device 10 correctly detects the DCI configured to schedule the data on the basis of the DCI format 4, the terminal device 10 detects data transmission scheduled by the DCI according to a parameter in the second numerology and control information in the detected DCI. For example, the terminal device 10 may determine the parameter detecting data transmission scheduled by the DCI according to a subcarrier spacing, total subcarrier number and channel prefix length in the second numerology in combination with other control information in the DCI, thereby detecting data transmission scheduled by the DCI.

TABLE 2

| Basic parameter set | DCI format |
| --- | --- |
| First basic parameter set | DCI format 1 |
|  | DCI format 2 |
| Second basic parameter set | DCI format 3 |
|  | DCI format 4 |

Optionally, different DCI formats correspond to different control information lengths, and/or DCI format indication bits in different DCI formats indicate different information.

Optionally, if different DCI formats correspond to different basic parameter sets and the different DCI formats include the same control information field, the same control information field occupies different numbers of bits in different DCI formats and/or the same control information field indicates different contents in the different DCI formats.

Here, a length of the DCI refers to the total bit number of control information in the DCI and a content of the DCI refers to a control information field in the DCI and a content indicated by each control information field.

Specifically, different numerologies correspond to different DCI formats and different DCI formats may be distinguished through at least one of lengths of DCI, contents of control information in the DCI, lengths of control information fields and contents indicated by the control information fields. Namely, lengths of DCI corresponding to different DCI foil cats are different, and/or contents of control information in the DCI corresponding to different DCI formats are different, and/or, for the same control information field, the same control information field in the DCI corresponding to different DCI formats occupies different numbers of bits, and/or, for the same control information field, the same control information field in the DCI corresponding to different DCI formats indicates different contents.

Different DCI formats may correspond to different DCI lengths. For example, a DCI format corresponding to the first numerology is the DCI format 1, a DCI format corresponding to the second numerology is the DCI format 2 and the DCI format 1 and the DCI format 2 include different numbers of information bits. Contents of control information in DCI corresponding to different DCI formats may be different. For example, the DCI format corresponding to the first numerology is the DCI format 1, the DCI format corresponding to the second numerology is the DCI format 2 and the DCI format 1, compared with the DCI format 2, includes one more control information field. For the same control information field, the same control information field in the DCI corresponding to different DCI formats may occupy different numbers of bits. For example, the DCI format corresponding to the first numerology is the DCI format 1, the DCI format corresponding to the second numerology is the DCI format 2, both of the DCI format 1 and the DCI format 2 include control information fields configured to indicate RB allocation, but bit numbers of the control information fields configured to indicate RB allocation are different because the two numerologies correspond to different frequency-domain resource regions. For the same control information field, contents indicated by the same control information field in the DCI corresponding to different DCI formats may also be different. For example, the DCI format corresponding to the first numerology is the DCI format 1, the DCI format corresponding to the second numerology is the DCI format 2, a DCI format corresponding to a third numerology is the DCI format 3, a DCI format corresponding to a fourth numerology is the DCI format 4, and each of the four DCI formats includes a 2-bit control information field indicating an ACK/NACK feedback time sequences to indicate a time sequence relationship between data transmission and a corresponding ACK/NACK. For the DCI format 1 corresponding to the first basic parameter set, four possible time sequences indicated by the control information field are {0, 1, 2, 3}. For the DCI format 2 corresponding to the second basic parameter set, four possible time sequences indicated by the control information field are {0, 2, 4, 6}. For the DCI format 3 corresponding to the third basic parameter set, four possible time sequences indicated by the control information field are {0, 3, 6, 9}. For the DCI format 4 corresponding to the fourth basic parameter set, four possible time sequences indicated by the control information field are {0, 4, 8, 12}. The contents indicated by the control information fields in different DCI corresponding to different numerologies are different.

For example, the correspondences between numerologies and DCI formats is illustrated in Table 2. The DCI format corresponding to the first numerology is the DCI format 1 and the DCI format 2, and the DCI format corresponding to the second numerology is the DCI format 3 and the DCI format 4. The network device 20 determines that the numerology used for data transmission on the subframe n is the second basic parameter set. The terminal device 10 may determine that the DCI format configured to schedule data transmission on the subframe n is the DCI format 3 and the DCI format 4 according to the correspondences between the second numerology and the DCI format. The numerology may include parameters such as the subcarrier spacing, a total number of subcarriers under a present system bandwidth and the signal prefix length. The network device 20 may pre-send parameter configuration conditions of the first numerology and the second numerology to the terminal device 10 and the terminal device 10 receives the parameter configuration conditions of the numerologies. There is made such a hypothesis that each of the four DCI formats includes the control information field configured to indicate an ACK/NACK feedback time sequence, specifically indicating a subframe offset between a data transmission subframe and an ACK/NACK feedback subframe. Optionally, the control information field in different DCI formats may occupy different numbers of bits. For example, bit numbers of the control information in the DCI format 1 and the DCI format 3 are the same (set to be M) and bit numbers of the control information in the DCI format 2 and the DCI format 4 are the same (set to be N). Optionally, different DCI formats corresponding to different parameter configuration sets may also include 2-bit control information fields configured to indicate ACK/NACK feedback time sequences, but the 2-bit control information fields configured to indicate the ACK/NACK feedback time sequences may indicate different contents, for example, as illustrated in Table 3.

TABLE 3

| DCI format | Indicated subframe offset value |
| --- | --- |
| DCI format 1 | {0, 1, 2, 3} |
| DCI format 2 | |
| DCI format 3 | {0, 2, 4, 6} |
| DCI format 4 | |

After the terminal device 10 determines the DCI format of the DCI according to the numerology and the correspondences between numerologies and DCI formats, the terminal device 10 may determine at least one of a length of the DCI, a content of the control information in the DCI, a bit number occupied by a certain control information field in the DCI and a content indicated by a certain control information field in the DCI and detect the DCI configured to schedule the data according to the DCI format.

Optionally, the control information field in the DCI format may include at least one of:

a control information field for indicating physical resource allocation, a control information field for indicating an ACK/NACK feedback time sequence, a control information field for indicating a frequency hopping configuration, a control information field for indicating an MCS, a control information field for indicating a subframe structure or a control information field for indicating a DMRS configuration.

The control information field configured to indicate physical resource allocation may be, for example, an RB allocation information field configured to indicate a PRB occupied by data transmission scheduled by the DCI. The control information field configured to indicate the ACK/NACK feedback time sequence indicates a time sequence relationship between data transmission and corresponding ACK/NACK feedback, for example, a subframe number offset between a subframe where data transmission is located and a subframe where corresponding ACK/NACK feedback is located. The control information field configured to indicate the frequency hopping configuration is, for example, a control information field for indicating frequency-domain frequency hopping. The control information field configured to indicate the DMRS is, for example, a control information field for indicating information of a port, scrambling sequence and the like for a DMRS. The control information field configured to indicate the subframe structure is, for example, a total OFDM symbol number of a subframe, or a GP number or location of the subframe or a number configuration of OFDM symbols of different types in the subframe, for example, a number or proportion configuration of downlink control symbols, downlink data symbols and uplink control symbols in the subframe or a number or proportion configuration of the downlink control symbols and uplink data symbols in the subframe.

Optionally, the control information field in the DCI format may include at least one of:

the control information field configured to indicate physical resource allocation, the control information field configured to indicate the ACK/NACK feedback time sequence, the control information field configured to indicate the frequency hopping configuration, the control information field configured to indicate the MCS, the control information field configured to indicate the subframe structure and the control information field configured to indicate the DMRS configuration.

Figure 4:
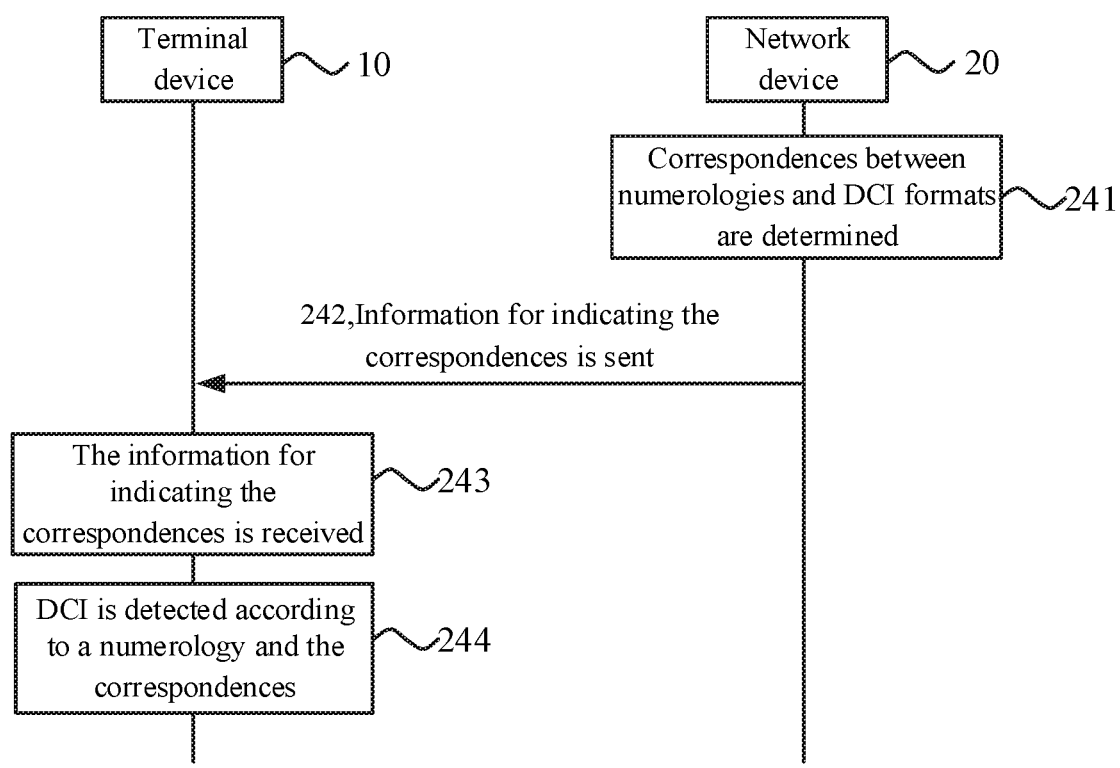
FIG. 4 is an interaction flowchart of a data transmission method according to another embodiment of the disclosure.

Optionally, the method 240 may further include S241 and S244. FIG. 4 is an interaction flowchart of a data transmission method according to another embodiment of the disclosure. The method includes 241 to 244. 240 may be replaced with 241 to 244.

In 241, the network device 20 determines the correspondences between numerologies and DCI formats.

In 242, the network device 20 sends indication information configured to indicate the correspondences to the terminal device 10.

In 243, the terminal device 10 receives the indication information configured to indicate the correspondences from the network device 20.

In 244, the terminal device 10 detects the DCI according to the basic parameter set and the correspondences.

Specifically, the operation that the terminal device 10 determines the correspondences between the numerology required by the DCI format configured to detect the DCI and the DCI format may refer to that the network device 20 determines and pre-indicates it to the terminal device 10. For example, the network device 20 sends the indication information to the terminal device 10 through high-layer signaling, the indication information indicating the correspondences between numerologies and DCI formats. The terminal device 10, after receiving the indication information indicating the correspondences, detects the DCI configured to schedule the data according to the determined numerology and the correspondences between numerologies and DCI formats.

It is to be understood that, when the terminal device 10 determines the DCI format configured to detect the DCI, the used corresponding relationship between the numerology and the DCI format may also be predetermined by the terminal device 10 and the network device 20. For example, the terminal device 10 determines the DCI format corresponding to the numerology according to the correspondences, specified in a protocol, between the numerology and the DCI format.

It is also to be understood that the terminal device 10 may determine the numerology used in transmitting the data and the DCI configured to schedule the data by executing 230 and 240. The terminal device 10 may also detect the DCI configured to schedule the data and determine the numerology used in transmitting the data according to the detected DCI, thereby detecting the data sent by the network device 20 or sending the data to the network device 20 according to the numerology and the DCI. For example, the terminal device 10 may detect the DCI configured to schedule the data on the basis of different DCI formats until the DCI is correctly detected according to a certain DCI format and determine the numerology used in transmitting the data according to the DCI format of the detected DCI and the correspondences between the DCI format and the numerology and/or a cyclic redundancy check code of the DCI.

In 251, the network device 20 sends the data to the terminal device 10 according to the numerology and the DCI.

Specifically, the network device 20 sends the data to the terminal device 10 according to the parameter in the numerology and the content of the control information in the DCI configured to schedule the data.

In 261, the terminal device 10 detects the data sent by the network device 20 according to the numerology and the DCI.

Specifically, the terminal device 10 detects the data sent by the network device 20 according to the parameter in the numerology and the content of the control information in the detected DCI configured to schedule the data.

Figure 5:
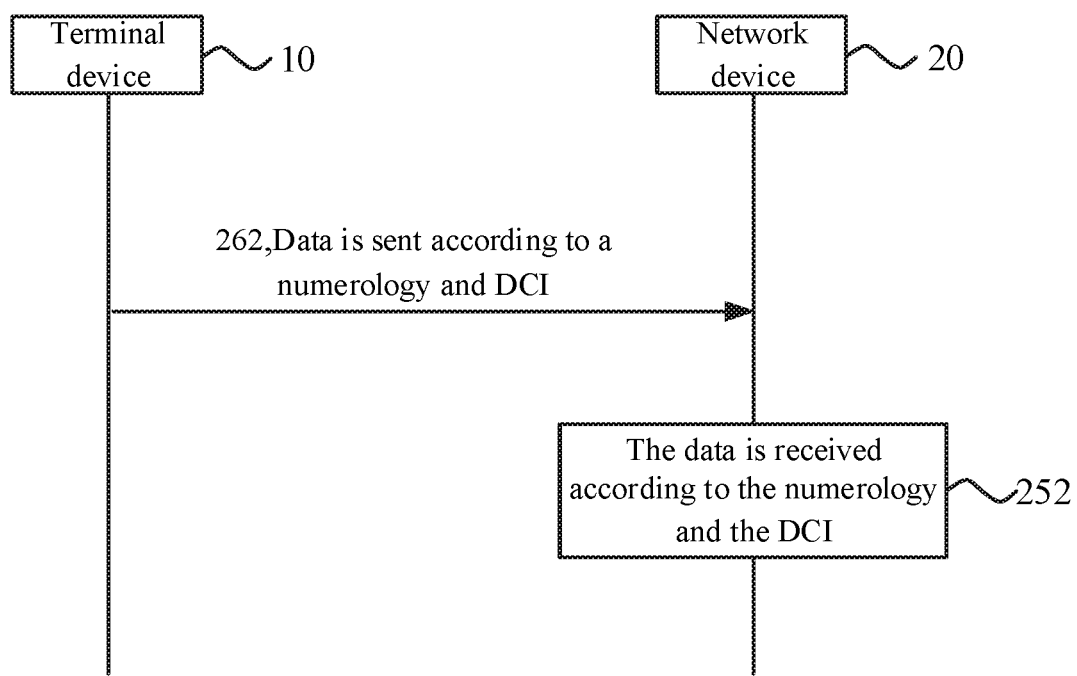
FIG. 5 is an interaction flowchart of a data transmission method according to another embodiment of the disclosure.

Optionally, 251 and 261 may further be replaced with 252 and 262 in FIG. 5 respectively. FIG. 5 is an interaction flowchart of a data transmission method according to another embodiment of the disclosure.

In 262, the terminal device 10 sends the data to the network device 20 according to the parameter in the numerology and the content of the control information in the detected DCI configured to schedule the data.

In 252, the network device 20 receives the data sent by the terminal device 10 according to the numerology and the DCI.

Specifically, in 250 and 260, the data may include uplink data or downlink data. If the transmitted data is the downlink data, the network device 20 sends the data to the terminal device 10, the DCI is DCI configured to schedule the downlink data, and the terminal device 10 detects related information about the downlink data sent by the network device 20, thereby correctly receiving the data, that is, 251 and 261 are executed. If the transmitted data is the uplink data, the terminal device 10 sends the data to the network device 20, the DCI is DCI configured to schedule the uplink data and the network device 20 receives the data sent by the terminal device 10, that is, 262 and 252 are executed.

It is to be understood that data transmission between the network device 20 and the terminal device 10 in the embodiment of the disclosure may include service data transmission and may also include control signaling transmission. There are no limits made herein.

In such a manner, according to the method of the embodiment of the disclosure, data transmission based on different numerologies is scheduled by use of different DCI formats, so that control signaling design flexibility is improved.

Optionally, data transmission with different numerologies may be scheduled through the independent control channel and different DCI formats, so that the control signaling design flexibility is further improved.

In addition, the terminal device may learn the DCI format used for blind detection of the DCI according to the basic parameter set, so that control channel detection complexity of the terminal device is reduced.

It is to be understood that, in various embodiments of the disclosure, a magnitude of a sequence number of each process does not mean an execution sequence and the execution sequence of each process should be determined by its function and an internal logic and should not form any limit to an implementation process of the embodiments of the disclosure.

The data transmission method according to the embodiments of the disclosure is described above in detail. A terminal device and network device according to the embodiments of the disclosure will be described below. It is to be understood that the network device and terminal device of the embodiments of the disclosure may execute various methods in the abovementioned embodiments of the disclosure. That is, the following specific working process of each device may refer to the corresponding process in the method embodiments.

Figure 6:
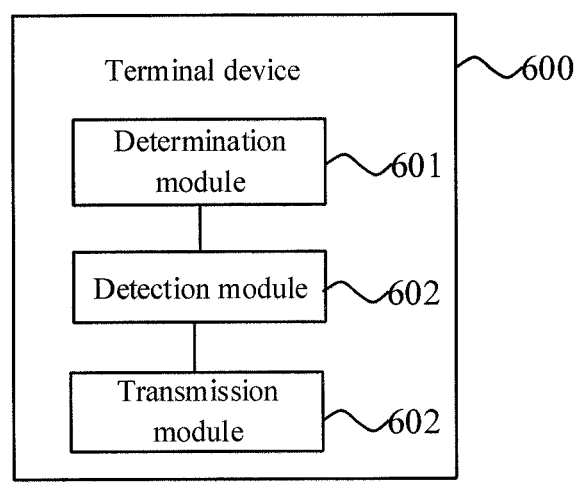
FIG. 6 is a structure block diagram of a terminal device according to an embodiment of the disclosure.

FIG. 6 is a schematic block diagram of a terminal device 600 according to an embodiment of the disclosure. As illustrated in FIG. 6, the terminal device 600 includes a determination module 601, a detection module 602 and a transmission module 603.

The determination module 601 is configured to determine a numerology used in transmitting data, the numerology including at least one resource parameter configured to determine a time-frequency resource transmitting the data.

The detection module 602 is configured to detect DCI sent by a network device and configured to schedule the data according to the numerology determined by the determination module 601.

The transmission module 603 is configured to detect the data sent by the network device or send the data to the network device according to the numerology determined by the determination module 601 and the DCI detected by the detection module 602.

In such a manner, according to the terminal device of the embodiment of the disclosure, data transmission based on different numerologies is scheduled by use of different DCI formats, so that control signaling design flexibility is improved.

Optionally, data transmission with different numerologies may be scheduled through the independent control channel and different DCI formats, so that the control signaling design flexibility is further improved.

In addition, the terminal device may learn the DCI format used for blind detection of the DCI according to the basic parameter set, so that control channel detection complexity of the terminal device is reduced.

Optionally, the determination module 601 is specifically configured to:

determine the numerology used in transmitting the data from multiple predefined numerologies.

Optionally, the detection module 602 is specifically configured to:

determine a DCI format configured to detect the DCI according to the numerology and correspondences between numerologies and DCI formats; and detect the DCI sent by the network device and configured to schedule the data according to the DCI format.

Optionally, before the detection module 602 determines the DCI format configured to detect the DCI according to the numerology and the correspondences between numerologies and DCI formats, the transmission module 603 is further configured to:

receive indication information sent by the network device, the indication information indicating the correspondences between numerologies and DCI formats.

Optionally, the detection module 602 is specifically configured to:

detect the DCI sent by the network device and configured to schedule the data according to at least one parameter in the basic parameter set.

Optionally, before the determination module 601 determines the numerology used in transmitting the data, the transmission module 603 is further configured to:

receive configuration information sent by the network device, the configuration information including information about the numerology used in transmitting the data.

The determination module 601 is specifically configured to:

determine the numerology used in transmitting the data according to the configuration information received by the transmission module.

Optionally, the determination module 601 is specifically configured to:

detect a target signal or target channel corresponding to the terminal device according to the multiple predefined numerologies; and determine a numerology corresponding to the target signal or the target channel as the numerology used in transmitting the data.

Optionally, different DCI formats correspond to different control information lengths, and/or DCI format indication bits in different DCI formats indicate different information.

Optionally, if different DCI formats correspond to different numerologies and the different DCI formats include the same control information field, the same control information field occupies different numbers of bits in different DCI and/or the same control information field indicates different contents in the different DCI formats.

Optionally, the control information field includes at least one of:

a control information field for indicating physical resource allocation, a control information field for indicating an ACK/NACK feedback time sequence, a control information field for indicating a frequency hopping configuration, a control information field for indicating an MCS, a control information field for indicating a subframe structure or a control information field for indicating a DMRS configuration.

Optionally, the numerology includes at least one of the following parameters:

a subcarrier spacing, a total number of subcarriers under a specific bandwidth, a total number of subcarriers of a PRB, an OFDM symbol length, the point number of Fourier transform or inverse Fourier transform for generating an OFDM signal, a total number of OFDM symbols of a TTI, a total number of TTIs in a specific time length or a signal prefix length.

Figure 7:
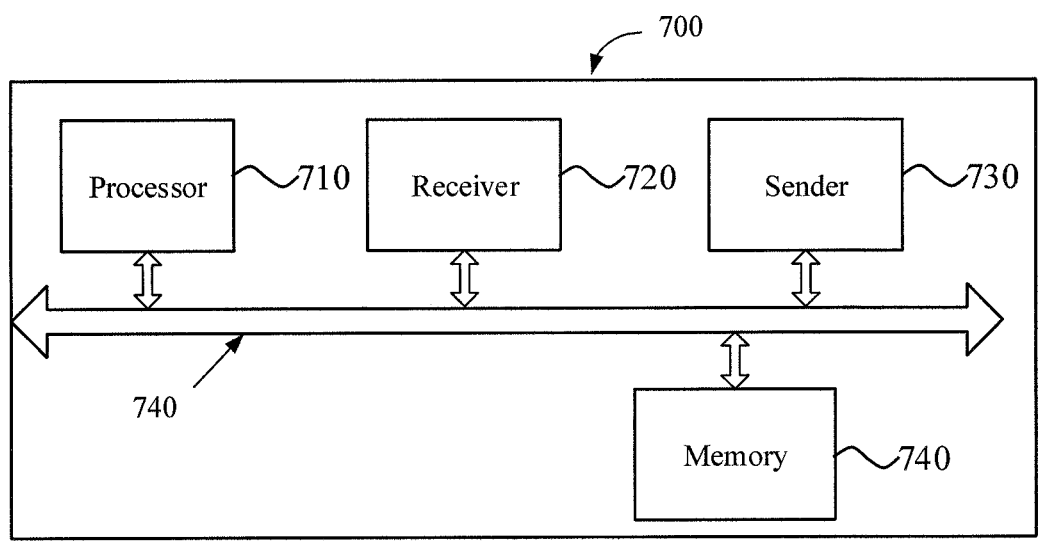
FIG. 7 is a structure block diagram of a terminal device according to an embodiment of the disclosure.

It is to be noted that, in the embodiment of the disclosure, the determination module 601 and the detection module 602 may be implemented by a processor and the transmission module 603 may be implemented by a transceiver. As illustrated in FIG. 7, a terminal device 700 may include a processor 710, a transceiver 720 and a memory 730. The transceiver 720 may include a receiver 721 and a sender 722. The memory 730 may be configured to store a basic parameter set, a DCI format, correspondences between numerologies and DCI formats and the like, and may further be configured to store a code executed by the processor 710 and the like. Each component in the terminal device 700 is coupled together through a bus system 740. The bus system 740 includes a data bus, and further includes a power bus, a control bus, a state signal bus and the like. The processor 710 is specifically configured to:

determine a numerology used in transmitting data, the numerology including at least one resource parameter configured to determine a time-frequency resource transmitting the data; and detect DCI sent by a network device and configured to schedule the data according to the basic parameter set.

The transceiver 720 is configured to detect the data sent by the network device or send the data to the network device according to the numerology determined by the processor 710 and the DCI detected by the processor 710.

Optionally, the processor 710 is specifically configured to:
  determine the numerology used in transmitting the data from multiple predefined numerologies.

Optionally, the processor 710 is specifically configured to:
  determine a DCI format configured to detect the DCI according to the numerology and correspondences between numerologies and DCI formats; and
  detect the DCI sent by the network device and configured to schedule the data according to the DCI format.

Optionally, before determining the DCI format configured to detect the DCI according to the numerology and the correspondences between numerologies and DCI formats, the processor 710 is further configured to:
  receive indication information sent by the network device, the indication information indicating the correspondences between numerologies and DCI formats.

Optionally, the processor 710 is specifically configured to:
  detect the DCI sent by the network device and configured to schedule the data according to at least one parameter in the basic parameter set.

Optionally, before the processor 710 determines the numerology used in transmitting the data, the transceiver 720 is further configured to:
  receive configuration information sent by the network device, the configuration information including information about the numerology used in transmitting the data.

The processor 710 is specifically configured to:
  determine the numerology used in transmitting the data according to the configuration information received by the transmission module.

Optionally, the processor 710 is specifically configured to:
  detect a target signal or target channel corresponding to the terminal device according to the multiple predefined numerologies; and
  determine a numerology corresponding to the target signal or the target channel as the numerology used in transmitting the data.

Optionally, different DCI formats correspond to different control information lengths, and/or DCI format indication bits in different DCI formats indicate different information.

Optionally, if different DCI formats correspond to different numerologies and the different DCI formats include the same control information field, the same control information field occupies different numbers of bits in different DCI and/or the same control information field indicates different contents in the different DCI formats.

Optionally, the control information field includes at least one of:
  a control information field for indicating physical resource allocation, a control information field for indicating an ACK/NACK feedback time sequence, a control information field for indicating a frequency hopping configuration, a control information field for indicating an MCS, a control information field for indicating a subframe structure or a control information field for indicating a DMRS configuration.

Optionally, the numerology includes at least one of the following parameters:
  a subcarrier spacing, a total number of subcarriers under a specific bandwidth, a total number of subcarriers of a PRB, an OFDM symbol length, the point number of Fourier transform or inverse Fourier transform for generating an OFDM signal, a total number of OFDM symbols of a TTI, a total number of TTIs in a specific time length or a signal prefix length.

Figure 8:
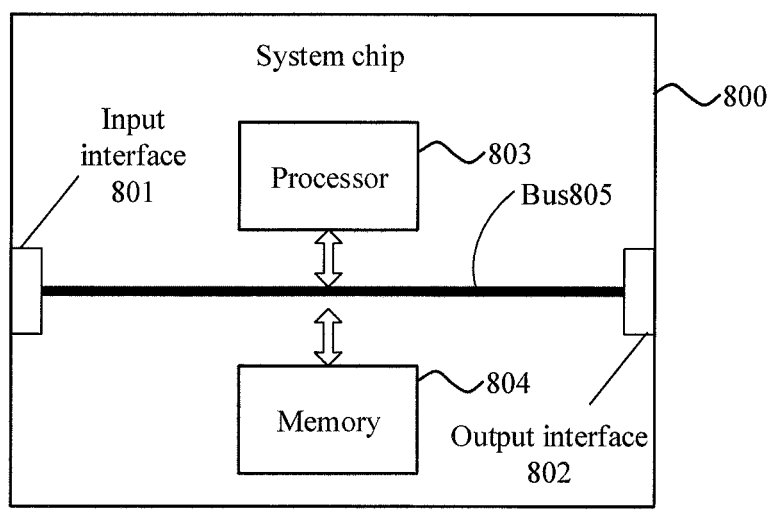
FIG. 8 is a schematic structure diagram of a system chip according to another embodiment of the disclosure.

FIG. 8 is a schematic structure diagram of a system chip according to an embodiment of the disclosure. The system chip 800 of FIG. 8 includes an input interface 801, an output interface 802, at least one processor 803 and a memory 804. The input interface 801, the output interface 802, the processor 803 and the memory 804 are connected through a bus 805. The processor 803 is configured to execute a code in the memory 804. When the code is executed, the processor 803 implements the method executed by the terminal device 10 in FIG. 2 to FIG. 5.

The terminal device 600 illustrated in FIG. 6 or the terminal device 700 illustrated in FIG. 7 or the system chip 800 illustrated in FIG. 8 may implement each process implemented by the terminal device 20 in the method embodiments of FIG. 2 to FIG. 5. No more elaborations will be made herein to avoid repetitions.

Figure 9:
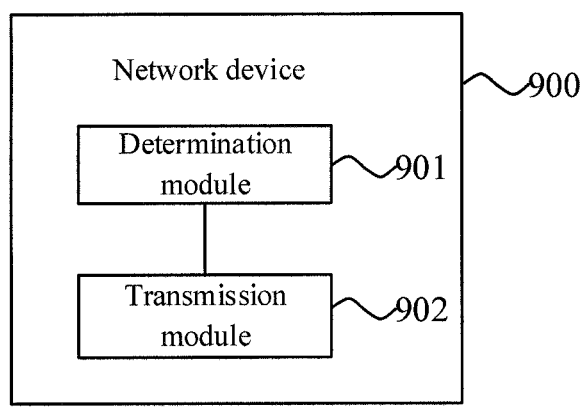
FIG. 9 is a structure block diagram of a network device according to an embodiment of the disclosure.

FIG. 9 is a schematic block diagram of a network device 900 according to an embodiment of the disclosure. As illustrated in FIG. 9, the network device 900 includes a determination module 901 and a transmission module 902.

The determination module 901 is configured to determine a numerology used in transmitting data, the numerology including at least one resource parameter configured to determine a time-frequency resource transmitting the data.

The transmission module 902 is configured to:
  send DCI configured to schedule the data to a terminal device according to the numerology determined by the determination module; and
  send the data to the terminal device or receive the data sent by the terminal device according to the numerology and the DCI.

In such a manner, according to the network device of the embodiment of the disclosure, data transmission based on different numerologies is scheduled by use of different DCI formats, so that control signaling design flexibility is improved.

Optionally, data transmission with different numerologies may be scheduled through the independent control channel and different DCI formats, so that the control signaling design flexibility is further improved.

Optionally, the determination module 901 is specifically configured to:
  determine the numerology used in transmitting the data from multiple predefined numerologies.

Optionally, the transmission module 902 is specifically configured to:
  determine a DCI format of the DCI according to the numerology and correspondences between numerologies and DCI formats; and
  send the DCI configured to schedule the data to the terminal device according to the DCI format.

Optionally, the determination module 901 is further configured to:
  determine the correspondences between numerologies and DCI formats.

The transmission module is further configured to send indication information to the terminal device, the indication information indicating the correspondences.

Optionally, the transmission module 902 is specifically configured to:
  send the DCI configured to schedule the data to the terminal device according to at least one parameter in the basic parameter set.

Optionally, after the numerology used in transmitting the data is determined, the transmission module 902 is further configured to:
  send configuration information to the terminal device, the configuration information including information about the numerology used in transmitting the data.

Optionally, different DCI formats correspond to different control information lengths, and/or DCI format indication bits in different DCI formats indicate different information.

Optionally, if different DCI formats correspond to different basic parameter sets and the different DCI formats include the same control information field, the same control information field occupies different numbers of bits in different DCI and/or the same control information field indicates different contents in the different DCI formats.

Optionally, the control information field includes at least one of:

a control information field for indicating physical resource allocation, a control information field for indicating an ACK/NACK feedback time sequence, a control information field for indicating a frequency hopping configuration, a control information field for indicating an MCS, a control information field for indicating a subframe structure or a control information field for indicating a DMRS configuration.

Optionally, the numerology includes at least one of the following parameters:

a subcarrier spacing, a total number of subcarriers under a specific bandwidth, a total number of subcarriers of a PRB, an OFDM symbol length, the point number of Fourier transform or inverse Fourier transform for generating an OFDM signal, a total number of OFDM symbols of a TTI, a total number of TTIs in a specific time length or a signal prefix length.

Figure 10:
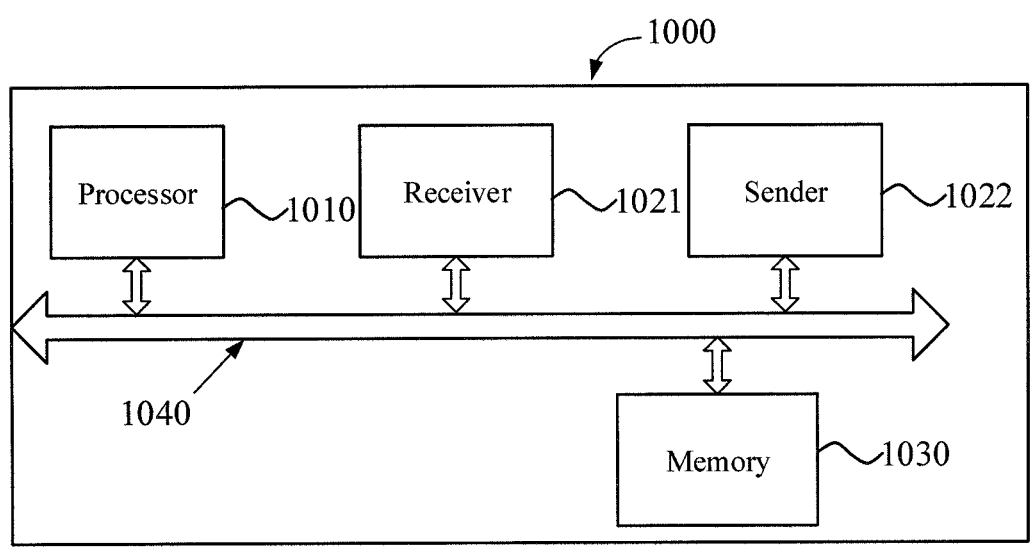
FIG. 10 is a structure block diagram of a network device according to an embodiment of the disclosure.

It is to be noted that, in the embodiment of the disclosure, the determination module 901 may be implemented by a processor and the transmission module 902 may be implemented by a receiver and a sender. As illustrated in FIG. 10, a network device 1000 may include a processor 1010, a transceiver 1020 and a memory 1030. The transceiver 1020 may include a receiver 1021 and a sender 1022. The memory 1030 may be configured to store a basic parameter set, a DCI format, correspondences between numerologies and DCI formats and the like, and may further be configured to store a code executed by the processor 1010 and the like. Each component in the network device 1000 is coupled together through a bus system 1040. The bus system 1040 includes a data bus, and further includes a power bus, a control bus, a state signal bus and the like. The processor 1010 is specifically configured to:

determine a numerology used in transmitting data, the numerology including at least one resource parameter configured to determine a time-frequency resource transmitting the data.

The transceiver 1020 is configured to:

send DCI configured to schedule the data to a terminal device according to the numerology determined by the determination module; and send the data to the terminal device or receive the data sent by the terminal device according to the numerology and the DCI.

Optionally, the processor 1010 is specifically configured to:

determine the numerology used in transmitting the data from multiple predefined numerologies.

Optionally, the transceiver 1020 is further configured to:

determine a DCI format of the DCI according to the numerology and correspondences between numerologies and DCI formats; and send the DCI configured to schedule the data to the terminal device according to the DCI format.

Optionally, the processor 1010 is further configured to:

determine the correspondences between numerologies and DCI formats.

The transceiver 1020 is further configured to send indication information to the terminal device, the indication information indicating the correspondences.

Optionally, the transceiver 1020 is specifically configured to:

send the DCI configured to schedule the data to the terminal device according to at least one parameter in the basic parameter set.

Optionally, after the numerology used in transmitting the data is determined, the transceiver 1020 is further configured to:

send configuration information to the terminal device, the configuration information including information about the numerology used in transmitting the data.

Optionally, different DCI formats correspond to different control information lengths, and/or DCI format indication bits in different DCI formats indicate different information.

Optionally, if different DCI formats correspond to different numerologies and the different DCI formats include the same control information field, the same control information field occupies different numbers of bits in different DCI and/or the same control information field indicates different contents in the different DCI formats.

Optionally, the control information field includes at least one of:

a control information field for indicating physical resource allocation, a control information field for indicating an ACK/NACK feedback time sequence, a control information field for indicating a frequency hopping configuration, a control information field for indicating an MCS, a control information field for indicating a subframe structure or a control information field for indicating a DMRS configuration.

Optionally, the numerology includes at least one of the following parameters:

a subcarrier spacing, a total number of subcarriers under a specific bandwidth, a total number of subcarriers of a PRB, an OFDM symbol length, the point number of Fourier transform or inverse Fourier transform for generating an OFDM signal, a total number of OFDM symbols of a TTI, a total number of TTIs in a specific time length or a signal prefix length.

Figure 11:
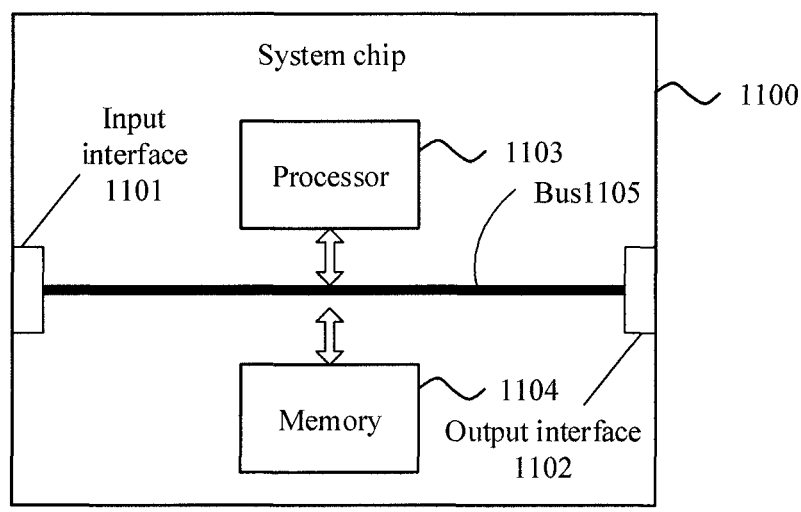
FIG. 11 is a schematic structure diagram of a system chip according to an embodiment of the disclosure.

FIG. 11 is a schematic structure diagram of a system chip according to an embodiment of the disclosure. The system chip 1100 of FIG. 11 includes an input interface 1101, an output interface 1102, at least one processor 1103 and a memory 1104. The input interface 1101, the output interface 1102, the processor 1103 and the memory 1104 are connected through a bus 1105. The processor 1103 is configured to execute a code in the memory 1104. When the code is executed, the processor 1103 implements the method executed by the network device 20 in FIG. 2 to FIG. 5.

The network device 900 illustrated in FIG. 9 or the network device 1000 illustrated in FIG. 10 or the system chip 1100 illustrated in FIG. 11 may implement each process implemented by the network device 20 in the method embodiments of FIG. 2 to FIG. 5. No more elaborations will be made herein to avoid repetitions.

It is to be understood that the processor in the embodiment of the disclosure may be an integrated circuit chip and has a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The operations of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories. The nonvolatile memory may be a ROM, a PROM, an Electrically PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

In addition, terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that, in the embodiments of the disclosure, "B corresponding to A" represents that B is associated with A and B may be determined according to A. It is also to be understood that determining B according to A does not mean that B is determined only according to A and B may also be determined according to A and/or other information.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for data transmission, comprising:
   determining, by a terminal device, a numerology, that comprises a subcarrier spacing and a signal prefix length, used in transmitting data, wherein the subcarrier spacing is a frequency interval between adjacent subcarriers, and is selected from at least one of 15 kHz, 30 kHz, 60 kHz or 120 kHz, and the signal prefix length indicates whether the Cyclic Prefix (CP) uses a normal CP or an extended CP;
   detecting, according to the numerology that comprises the subcarrier spacing and the signal prefix length, by the terminal device, Downlink Control Information (DCI) sent by a network device and configured to schedule the data; and detecting, by the terminal device, the data sent by the network device or sending the data to the network device according to the numerology that comprises the subcarrier spacing and the signal prefix length and the detected DCI.

2. The method of claim 1, wherein determining, by the terminal device, the numerology that comprises the subcarrier spacing and the signal prefix length used in transmitting the data comprises:
determining, by the terminal device, the numerology that comprises the subcarrier spacing and the signal prefix length used in transmitting the data from a plurality of predefined numerologies.

3. The method of claim 1, further comprising:
before determining, by the terminal device, the numerology that comprises the subcarrier spacing and the signal prefix length used in transmitting the data, receiving, by the terminal device, configuration information sent by the network device, the configuration information comprising information about the numerology that comprises the subcarrier spacing and the signal prefix length used in transmitting the data, wherein
determining, by the terminal device, the numerology that comprises the subcarrier spacing and the signal prefix length used in transmitting the data comprises:
determining, by the terminal device, the numerology that comprises the subcarrier spacing and the signal prefix length used in transmitting the data according to the configuration information.

4. The method of claim 1, wherein determining, by the terminal device, the numerology that comprises the subcarrier spacing and the signal prefix length used in transmitting the data comprises:
detecting, by the terminal device, a target signal or target channel corresponding to the terminal device according to a plurality of predefined numerologies; and
determining, by the terminal device, a numerology adopted when the target signal or the target channel is successfully detected as the numerology used in transmitting the data.

5. The method of claim 1, wherein detecting, by the terminal equipment, the DCI sent by the network device and configured to schedule the data according to the numerology that comprises the subcarrier spacing and the signal prefix length comprises:
detecting, by the terminal device, the DCI sent by the network device and configured to schedule the data according to at least one parameter in the numerology that comprises the subcarrier spacing and the signal prefix length.

6. The method of claim 1, wherein detecting, by the terminal equipment, the DCI sent by the network device and configured to schedule the data according to the numerology that comprises the subcarrier spacing and the signal prefix length comprises:
determining, by the terminal device, a DCI format configured to detect the DCI according to the numerology that comprises the subcarrier spacing and the signal prefix length and correspondences between numerologies and DCI formats; and
detecting, by the terminal device, the DCI sent by the network device and configured to schedule the data according to the DCI format.

7. The method of claim 6, further comprising:
before determining, by the terminal device, the DCI format configured to detect the DCI according to the numerology that comprises the subcarrier spacing and the signal prefix length and the correspondences between numerologies and DCI formats, receiving, by the terminal device, indication information sent by the network device, the indication information indicating the correspondences between numerologies and DCI formats.

8. The method of claim 6, wherein different DCI formats correspond to different control information lengths, and/or DCI format indication bits in different DCI formats indicate different information.

9. The method of claim 6, wherein, in responsive to that different DCI formats correspond to different numerologies and the different DCI formats comprise a same control information field, the same control information field occupies different numbers of bits in different DCI formats and/or the same control information field indicates different contents in the different DCI formats.

10. The method of claim 9, wherein the control information field comprises at least one of:
a control information field for indicating physical resource allocation, a control information field for indicating an Acknowledgment (ACK)/Negative Acknowledgment (NACK) feedback time sequence, a control information field for indicating a frequency hopping configuration, a control information field for indicating a Modulation Coding Scheme (MCS), a control information field for indicating a subframe structure or a control information field for indicating a Demodulation Reference Signal (DMRS) configuration.

11. The method of claim 1, wherein the numerology further comprises at least one of the following parameters:
a total number of subcarriers under a specific bandwidth, a total number of subcarriers of a Physical Resource Block (PRB), an Orthogonal Frequency Division Multiplexing (OFDM) symbol length, the point number of Fourier transform or inverse Fourier transform for generating an OFDM signal, a total number of OFDM symbols of a Transmission Time Interval (TTI), or a total number of TTIs in a specific time length.

12. A method for data transmission, comprising:
determining, by a network device, a numerology, that comprises a subcarrier spacing and a signal prefix length, used in transmitting data, wherein the subcarrier spacing is a frequency interval between adjacent subcarriers, and is selected from at least one of 15 kHz, 30 kHz, 60 kHz or 120 kHz, and the signal prefix length indicates whether the Cyclic Prefix (CP uses a normal CP or an extended CP;
sending, according to the numerology that comprises the subcarrier spacing and the signal prefix length, by the network device, Downlink Control Information (DCI) configured to schedule the data to a terminal device; and
sending, by the network device, the data to the terminal device or receiving the data sent by the terminal device according to the numerology that comprises the subcarrier spacing and the signal prefix length and the DCI.

13. A terminal device, comprising:
a memory having stored instructions;
a processor for executing the instructions to implement a plurality of modules comprising:
a determination module, configured to determine a numerology, that comprises a subcarrier spacing and a signal prefix length, used in transmitting data, herein the subcarrier spacing is a frequency interval between adjacent subcarriers, and is selected from at least one of 15 kHz, 30 kHz, 60 kHz or 120 kHz, and the signal prefix length indicates whether the Cyclic Prefix (CP) uses a normal CP or an extended CP;

a detection module, configured to detect, according to the numerology that comprises the subcarrier spacing and the signal prefix length determined by the determination module, Downlink Control Information (DCI) sent by a network device and configured to schedule the data; and a transmission module, configured to detect the data sent by the network device or send the data to the network device according to the numerology that comprises the subcarrier spacing and the signal prefix length determined by the determination module and the DCI detected by the detection module.

14. The terminal device of claim 13, wherein the determination module is specifically configured to:

determine the numerology that comprises the subcarrier spacing and the signal prefix length used in transmitting the data from a plurality of predefined numerologies.

15. The terminal device of claim 13, wherein the transmission module is further configured to:

before the determination module determines the numerology that comprises the subcarrier spacing and the signal prefix length used in transmitting the data, receive configuration information sent by the network device, the configuration information comprising information about the numerology that comprises the subcarrier spacing and the signal prefix length used in transmitting the data;

the determination module is specifically configured to:

determine the numerology that comprises the subcarrier spacing and the signal prefix length used in transmitting the data according to the configuration information received by the transmission module.

16. The terminal device of claim 13, wherein the determination module is specifically configured to:

detect a target signal or target channel corresponding to the terminal device according to the plurality of predefined numerologies; and determine a numerology corresponding to the target signal or the target channel as the numerology used in transmitting the data.

17. The terminal device of claim 13, wherein the detection module is specifically configured to:

detect the DCI sent by the network device and configured to schedule the data according to at least one parameter in the numerology that comprises the subcarrier spacing and the signal prefix length; or determine a DCI format configured to detect the DCI according to the numerology that comprises the subcarrier spacing and the signal prefix length and correspondences between numerologies and DCI formats; and detect the DCI sent by the network device and configured to schedule the data according to the DCI format, wherein the transmission module is further configured to:

before the detection module determines the DCI format configured to detect the DCI according to the numerology that comprises the subcarrier spacing and the signal prefix length and the correspondences between numerologies and DCI formats, receive indication information sent by the network device, the indication information indicating the correspondences between numerologies and DCI formats.

18. The terminal device of claim 17, wherein different DCI formats correspond to different control information lengths, and/or DCI format indication bits in different DCI formats indicate different information.

19. The terminal device of claim 17, wherein in responsive to that different DCI formats correspond to different numerologies and the different DCI formats comprise a same control information field, the same control information field occupies different numbers of bits in different DCI formats and/or the same control information field indicates different contents in the different DCI formats, and wherein the control information field comprises at least one of: a control information field for indicating physical resource allocation, a control information field for indicating an Acknowledgment (ACK)/Negative Acknowledgment (NACK) feedback time sequence, a control information field for indicating a frequency hopping configuration, a control information field for indicating a Modulation Coding Scheme (MCS), a control information field for indicating a subframe structure or a control information field for indicating a Demodulation Reference Signal (DMRS) configuration.

20. The terminal device of claim 13, wherein the numerology further comprises at least one of the following parameters:

a total number of subcarriers under a specific bandwidth, a total number of subcarriers of a Physical Resource Block (PRB), an Orthogonal Frequency Division Multiplexing (OFDM) symbol length, the point number of Fourier transform or inverse Fourier transform for generating an OFDM signal, a total number of OFDM symbols of a Transmission Time Interval (TTI), or a total number of TTIs in a specific time length.

* * * * *

UNITED STATES PATENT AND TRADEMARK OFFICE
CERTIFICATE OF CORRECTION

PATENT NO. : 10,856,283 B2
APPLICATION NO. : 16/098378
DATED : December 1, 2020
INVENTOR(S) : Hai Tang Page 1 of 1

It is certified that error appears in the above-identified patent and that said Letters Patent is hereby corrected as shown below:

On the Title Page

(71) Applicant reads:
"Guangdong (CN)"
Should read:
--Dongguan, Guangdong (CN)--

(73) Assignee reads:
"Guangdong (CN)"
Should read:
--Dongguan, Guangdong (CN)--

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*